United States Patent
Koppineedi et al.

(10) Patent No.: US 10,254,027 B2
(45) Date of Patent: Apr. 9, 2019

(54) METHOD AND SYSTEM FOR CONTROLLING OPERATION OF EVAPORATOR FANS IN A TRANSPORT REFRIGERATION SYSTEM

(71) Applicant: THERMO KING CORPORATION, Minneapolis, MN (US)

(72) Inventors: Srinivasa Rao Koppineedi, Bangalore (IN); Panayu Robert Srichai, Minneapolis, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 1058 days.

(21) Appl. No.: 14/268,022

(22) Filed: May 2, 2014

(65) Prior Publication Data

US 2015/0316313 A1 Nov. 5, 2015

(51) Int. Cl.
    *F25B 5/02* (2006.01)
    *F25B 49/02* (2006.01)
    (Continued)

(52) U.S. Cl.
    CPC .............. *F25B 49/02* (2013.01); *F25B 5/02* (2013.01); *F25B 39/02* (2013.01); *F25D 11/022* (2013.01); *F25D 17/06* (2013.01); *F25D 17/067* (2013.01); *F25D 29/003* (2013.01); *F25B 2500/19* (2013.01); *F25B 2600/01* (2013.01); *F25B 2600/112* (2013.01);
    (Continued)

(58) Field of Classification Search
    CPC .. F25B 2700/21172; F25B 2700/21173; F25B 2700/1933; F25B 2347/023; F25B 2700/173; F25B 2600/112; F25B 2600/01; F25B 2600/23; F25D 11/022; F25D 17/067; B60H 2001/3261
    USPC .............. 62/200; 236/1 B; 700/277; 165/208
    See application file for complete search history.

(56) References Cited

U.S. PATENT DOCUMENTS

| 4,445,342 A | 5/1984 | Warner |
| 5,490,394 A * | 2/1996 | Marques ................. F25D 17/06 62/131 |

(Continued)

FOREIGN PATENT DOCUMENTS

| EP | 2075516 A2 * | 7/2009 | ............... F25B 5/02 |
| EP | 2149466 | 2/2010 | |

(Continued)

OTHER PUBLICATIONS

International search report for International application No. PCT/US2015/028814, dated Jul. 27, 2015 (3 pages).

(Continued)

*Primary Examiner* — Christopher R Zerphey
*Assistant Examiner* — Schyler S Sanks
(74) *Attorney, Agent, or Firm* — Hamre, Schumann, Mueller & Larson, P.C.

(57) ABSTRACT

Methods and systems for controlling the operation of the evaporator fans in a transport refrigeration system (TRS) are described. In some examples, the TRS is a multi-zone temperature control system (MTCS). The methods and systems described herein generally dynamically control a plurality of system fans in MTCSs in instances where running the system fans can lead to inefficiencies in energy consumption and fluctuations in temperature control.

16 Claims, 7 Drawing Sheets

(51) Int. Cl.
*F25D 17/06* (2006.01)
*F25B 39/02* (2006.01)
*F25D 11/02* (2006.01)
*F25D 29/00* (2006.01)

(52) U.S. Cl.
CPC ......... *F25B 2700/1933* (2013.01); *F25B 2700/21171* (2013.01); *F25B 2700/21175* (2013.01); *Y02B 30/743* (2013.01)

(56) References Cited

U.S. PATENT DOCUMENTS

| | | | |
|---|---|---|---|
| 6,460,356 | B1 | 10/2002 | Tao et al. |
| 7,451,614 | B2 | 11/2008 | Luehrs et al. |
| 7,878,013 | B2 | 2/2011 | Matsuno et al. |
| 7,937,962 | B2 * | 5/2011 | Dudley .................. F25B 5/02 165/208 |
| 2004/0084175 | A1 | 5/2004 | Kranz et al. |
| 2007/0261424 | A1 | 11/2007 | Wang |
| 2008/0245086 | A1 | 10/2008 | Schenkel et al. |
| 2008/0289354 | A1 * | 11/2008 | Dudley .................. F25B 5/02 62/335 |
| 2010/0106302 | A1 * | 4/2010 | Thogersen ............ F25D 29/003 700/275 |
| 2010/0107661 | A1 | 5/2010 | Awwad et al. |
| 2011/0138820 | A1 | 6/2011 | Weeth et al. |
| 2011/0209490 | A1 | 9/2011 | Mijanovic et al. |
| 2012/0000222 | A1 * | 1/2012 | Fink .................. F25D 29/003 62/115 |
| 2012/0079840 | A1 | 4/2012 | Lukasse et al. |
| 2012/0111044 | A1 | 5/2012 | Chen et al. |
| 2012/0137710 | A1 | 6/2012 | Reimann et al. |
| 2012/0137713 | A1 * | 6/2012 | Duraisamy ............... B60P 3/20 62/228.1 |
| 2012/0198866 | A1 | 8/2012 | Zeidner |
| 2012/0227427 | A1 | 9/2012 | Liu et al. |
| 2012/0318007 | A1 * | 12/2012 | Lukasse .................. F25B 49/02 62/89 |
| 2013/0000342 | A1 | 1/2013 | Blasko et al. |
| 2013/0014527 | A1 | 1/2013 | Lukasse et al. |
| 2013/0086929 | A1 * | 4/2013 | Senf, Jr. ................ F25D 21/006 62/80 |
| 2013/0255297 | A1 * | 10/2013 | Matsuoka ............... F24F 11/006 62/180 |

FOREIGN PATENT DOCUMENTS

| | | |
|---|---|---|
| JP | 2010249482 | 11/2010 |
| WO | 2008094158 | 8/2008 |
| WO | 2010051198 | 5/2010 |

OTHER PUBLICATIONS

Written opinion for International application No. PCT/US2015/028814, dated Jul. 27, 2015 (4 pages).

Supplementary European Search Report issued in corresponding European Application No. 15786047.9 dated Nov. 12, 2017 (8 pages).

* cited by examiner

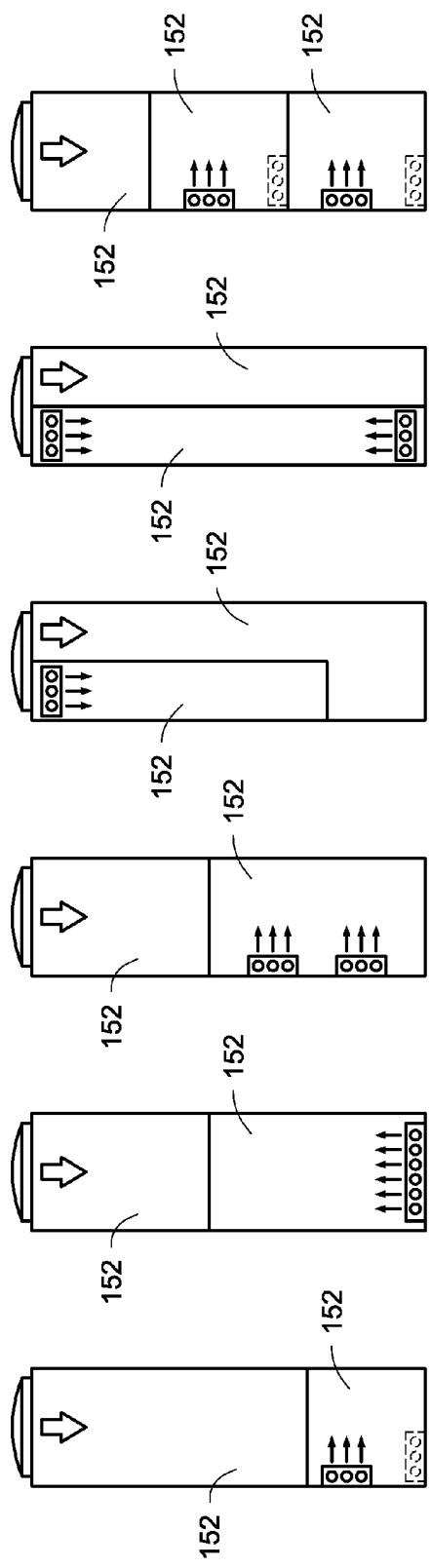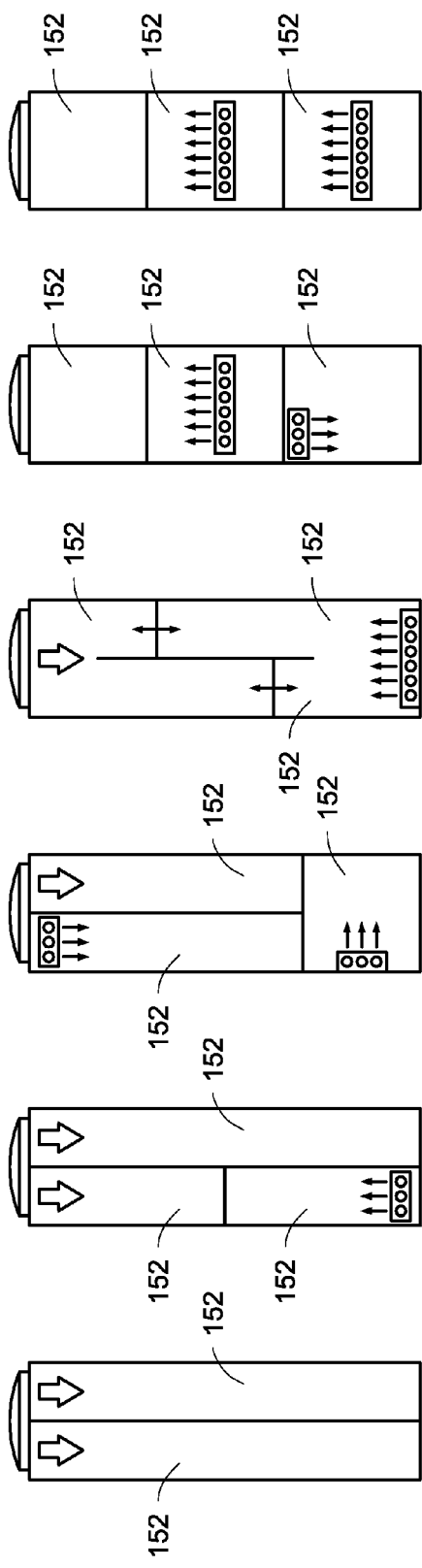

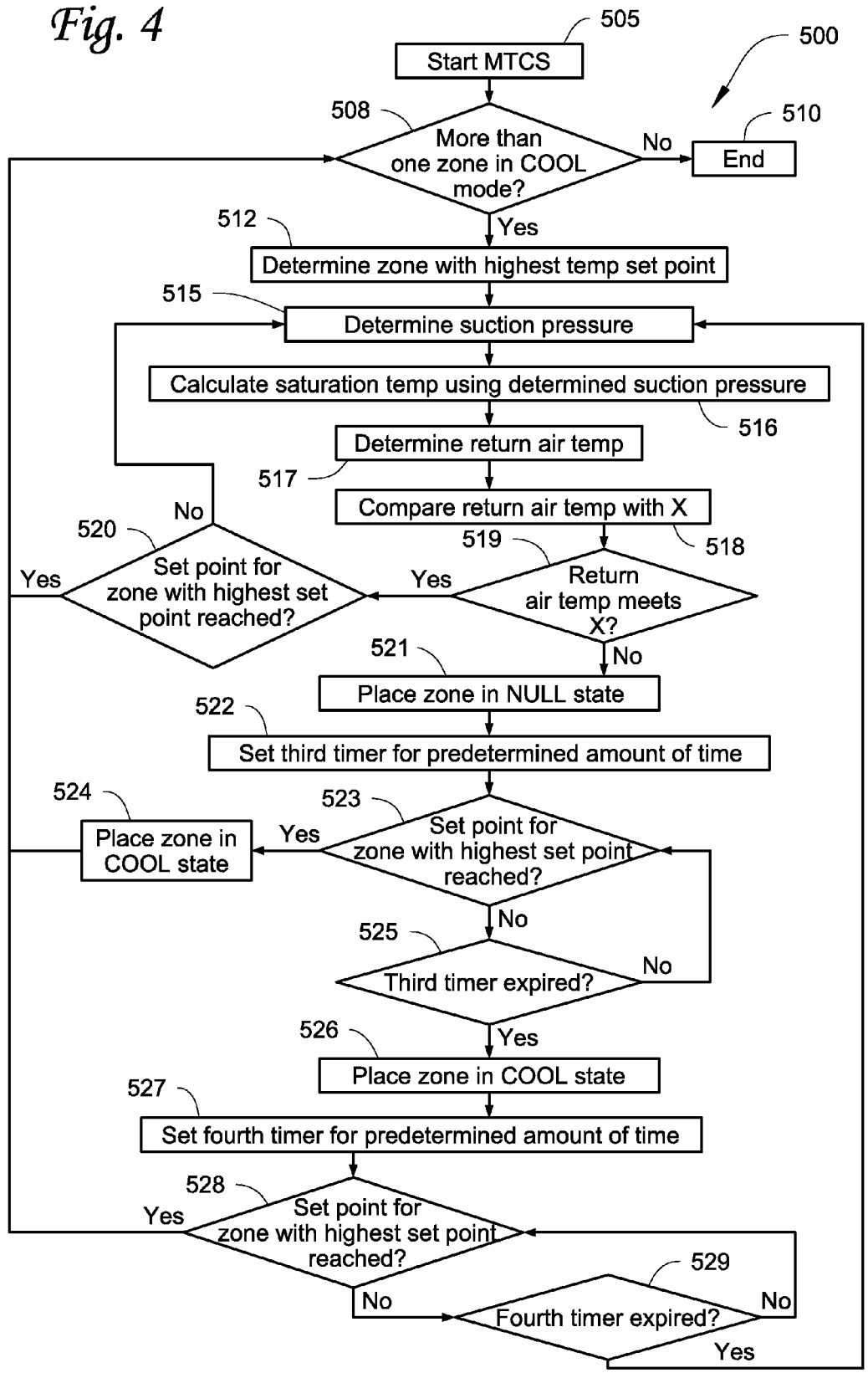

METHOD AND SYSTEM FOR CONTROLLING OPERATION OF EVAPORATOR FANS IN A TRANSPORT REFRIGERATION SYSTEM

The embodiments disclosed herein relate generally to a transport refrigeration system (TRS). More particularly, the embodiments relate to methods and systems for controlling the operation of the evaporator fans in a TRS that is a multi-zone temperature control system.

BACKGROUND

A transport refrigeration system (TRS) is generally used to control an environmental condition (e.g., temperature, humidity, air quality, and the like) within a refrigerated transport unit (e.g., a container on a flat car, an intermodal container, etc.), a truck, a box car, or other similar transport unit (generally referred to as a "refrigerated transport unit"). TRSs can be multi-zone temperature control systems (MTCS), which are known. The MTCS can be used to cool, heat and defrost multiple locations within the transport unit (TU) to multiple different temperatures. The MTCS can include a host unit, and one or more remote units that may be provided in different locations of the TU for separate cooling of the respective locations. In some cases, the MTCS can have two or more remote units without a host unit.

SUMMARY

The embodiments described herein are directed to a TRS. In particular, the embodiments described herein are directed to methods and systems for controlling the operation of evaporator fans in the TRS. In some examples, the TRS is a multi-zone temperature control system (MTCS).

The methods and systems described herein generally control dynamically a plurality of evaporator fans in MTCSs in instances where running the evaporator fans can lead to inefficiencies in energy consumption and fluctuations in temperature control. In general, the MTCS can be used to cool, heat and/or defrost simultaneously more than one zone. In the discussion that follows, the MTCS will be described as cooling the respective zones.

For instance, MTCSs typically have a host unit and one or more remote units to distribute a cooling capacity to different zones. Each of these remote units generally includes an evaporator and an evaporator fan, and is connected to the host unit via a common refrigerant suction line. Problems can arise, for instance, where two of the remote units are calling for cooling at different temperatures in different zones, for example, a zone for cooling fresh produce (hereinafter, "fresh zone"), and a zone for cooling frozen goods (hereinafter, "frozen zone"). In this instance, the fresh zone can require a higher evaporating temperature since there is less cooling relative to the frozen zone. This means that the evaporator for the remote unit of the fresh zone has a higher suction pressure relative to that of the frozen zone, thereby dominating the pressure at the common suction line. This can cause the frozen zone not to cool. The frozen zone actually can be heating due to the heat added from the remote evaporator fans running. Heat also can be added due to air circulation over high pressure refrigerant in the evaporator. Such occurrences can lead to, for example, increases in system run time, more fuel consumption and fluctuation in temperature control.

The methods and systems described herein generally control dynamically the evaporator fans included in the MTCS to decrease run time and thereby improve, for example, energy efficiency of the system.

In some embodiments, the systems and methods described herein provide for controlling the operation of a plurality of evaporator fans based on one or more operating parameters relative to the evaporator and/or zone. Note that in some instances, one zone may have two or more evaporators connected in parallel.

In some examples, the operating parameters can include a return air temperature and/or a discharge air temperature. In other examples, the operating parameters can include a suction pressure and/or a saturated temperature.

In one embodiment of the process of controlling the operation of the evaporator fans, a determination is made where there is more than one zone, e.g., a first zone, a second zone and a third zone, that needs cooling. In some examples, a zone that requires cooling means that the temperature set point of that zone is lower than the current temperature as measured by a return air sensor. If more than one zone requires cooling, the process generally involves determining the zone with the highest temperature set point relative to the other zones (hereinafter, the zone with the highest temperature set point will be referred to as the "first zone"), and initially satisfying the set point of the first zone before satisfying the set point(s) for the other zone(s).

In one example, the process involves determining a parameter that is reflective of an amount of heat added by the evaporator fan relative to the cooling capacity of the unit for each of the zones other than the first zone. The parameter then is used to determine whether the respective zone(s) should be in a NULL state or a COOL state. In some examples, a zone being placed in a NULL state means that one or more refrigerant components, e.g., the evaporator and/or the evaporator fans, is operated so that there is, e.g., air flow and no or limited refrigerant flow, no or limited refrigerant air flow and no or limited air flow, or refrigerant flow and no or limited refrigerant air flow. Note that in the embodiments described herein, the NULL state is illustrated as being a state where the evaporator fans are OFF so that there is no air flow. However, it is to be realized that the concepts described herein can be applicable in instances where the NULL state is a state where the air flow is limited, e.g., by decreasing the speed of the evaporator fans, as opposed to shutting the evaporator fans OFF.

In some examples, a zone being placed in a COOL state means that the refrigerant component(s), e.g., the evaporator and the evaporator fans, is operated so there is refrigerant flow and air flow.

In some examples, the parameter is used to determine whether a zone should be in a NULL sate even though the zone requires cooling. The sequence of events that occurs in one embodiment of the process is as follows. (1) If the respective zones that require cooling are placed in to a NULL state based on the parameter, then a first timer is set for a predetermined amount of time. (2) After the first timer expires, the respective zones that were placed in a NULL state even though the zone requires cooling are placed in a COOL state and a second timer is set for a predetermined amount of time. (3) After the second timer expires, the parameter is then determined again, and used to determine whether a zone should be in a NULL state even though the zone requires cooling. Steps (1)-(3) are then repeated until the set point for the first zone is satisfied.

In one implementation, the parameter used is the difference between a return air temperature and a discharge air temperature. In this instance, this difference is compared with a predetermined value. In some instances, if the difference between the return air temperature and the discharge temperature is less than the predetermined value for any one of the zones other than the first zone, e.g., the second zone, then the second zone is placed in a NULL state. Then, a first timer is set for a predetermined amount of time. In some examples, the first timer is set for an estimated amount of time for the first zone to reach its set point.

In some implementations, if the set point for the first zone is not reached after the first timer expires, then the evaporator fan(s) for zone(s) other than the first zone that were previously in the NULL state, for example, the second zone, is placed in the COOL state. Then a second timer is set for a predetermined amount of time. After the second timer expires, a determination is made again as to a return air temperature and a discharge air temperature for the zones other than the first zone, a calculation is made as to the difference between the two parameters for each of the zones, and a comparison is made between this difference and a predetermined value for each of the zones. Based on this comparison, a determination is made as to whether any of the zones other than the first zone needs to be in the NULL state.

In some examples, as soon as the set point for the first zone is reached, the first zone is placed in the NULL state. In some examples, a determination is made as to a set point of the zone with the next highest temperature set point relative to the other zones, e.g., the second zone. A process similar to that described above for the first zone would then be implemented for the second zone.

In another example, the parameter used is a suction pressure that is, for example, located on a suction line upstream of a throttle valve. The process further involves calculating a saturated temperature using the determined value for the suction pressure. In some examples, the calculation of the saturated temperature is based on the refrigerant used in the system.

In some implementations, the return air temperature is determined for the zone(s) other than the first zone that requires cooling, for example, the second zone. In some examples, the determined return air temperature, e.g., for the second zone, is compared with X, which is a first predetermined value. In one example, X is a function of the determined value for the saturated temperature and Y, which is a second predetermined value. In one instance, X equals the determined value for the suction pressure plus Y.

In some examples, if the determined return air temperature for the second zone is less than X, then the second zone is placed in a NULL state. In some examples, a third timer is set for a predetermined amount of time. In some examples, the third timer is set for an estimated amount of time for the first zone to reach its set point.

In some examples, if the set point is not reached for the first zone after the third timer expires, then the evaporator fan(s) for zone(s) other than the first zone that were previously in the NULL state, for example, the second zone, is placed in the COOL state. Then, a fourth timer is set for a predetermined amount of time. After the fourth timer expires, then the return air temperature is determined again for the zone(s) other than the first zone that requires cooling, for example, the second zone. The determined return air temperature, e.g., for the second zone, is compared with X, and a determination is made as to whether the respective zone(s) needs to be placed in a NULL or COOL state based on the comparison.

In some examples, when the set point for the first zone is reached, the first zone is placed in a NULL state. A determination is then made as to a set point of the zone with the next highest temperature set point relative to the other zones, e.g., the second zone. In some examples, a process similar to that described above for the first zone would then be implemented for the second zone.

Other aspects of the invention will become apparent by consideration of the detailed description and accompanying drawings.

BRIEF DESCRIPTION OF THE DRAWINGS

Referring now to the drawings in which like reference numbers represent corresponding parts throughout.

FIGS. 1C-1 to 1C-12 illustrate schematic top views of a TU shown in FIG. 1A with different zone configurations, according to one embodiment.

FIG. 2 illustrates a flow chart of a process of controlling the evaporator fans, according to one embodiment.

FIG. 3 illustrates a flow chart of a process of controlling the evaporator fans, according to one embodiment.

FIG. 4 illustrate a flow chart of a process of controlling the evaporator fans, according to some embodiments.

DETAILED DESCRIPTION

The embodiments described herein are directed to a transport refrigeration system (TRS). More particularly, the embodiments relate to methods and systems for controlling the operation of evaporator fans in a TRS. In some examples, the TRS is a multi-zone temperature control system (MTCS).

References are made to the accompanying drawings that form a part hereof, and in which is shown by way of illustration of the embodiments in which the methods and systems described herein may be practiced. The term "refrigeration transport unit" generally refers to, for example, a conditioned trailer, container, railcars or other type of transport unit, etc. The term "transport refrigeration system" or "TRS" refers to a refrigeration system for controlling the refrigeration of a conditioned interior space of the reefer. The term "TRS Controller" refers to an electronic device that is configured to manage, command, direct and regulate the behavior of one or more TRS refrigeration components of a refrigeration circuit (e.g., an evaporator, a condenser, a compressor, an expansion valve (EXV), etc.), a genset, etc.

It will be appreciated that the embodiments described herein may be used in any suitable temperature controlled apparatus such as a ship board container, an air cargo cabin, an over the road truck cabin, etc. The TRS generally may be a vapor-compressor type refrigeration system, or any other suitable refrigeration system that can use refrigerant, cold plate technology, etc. In some examples, the TRS is a MTCS, as will be described more in detail below.

Figure 1A:
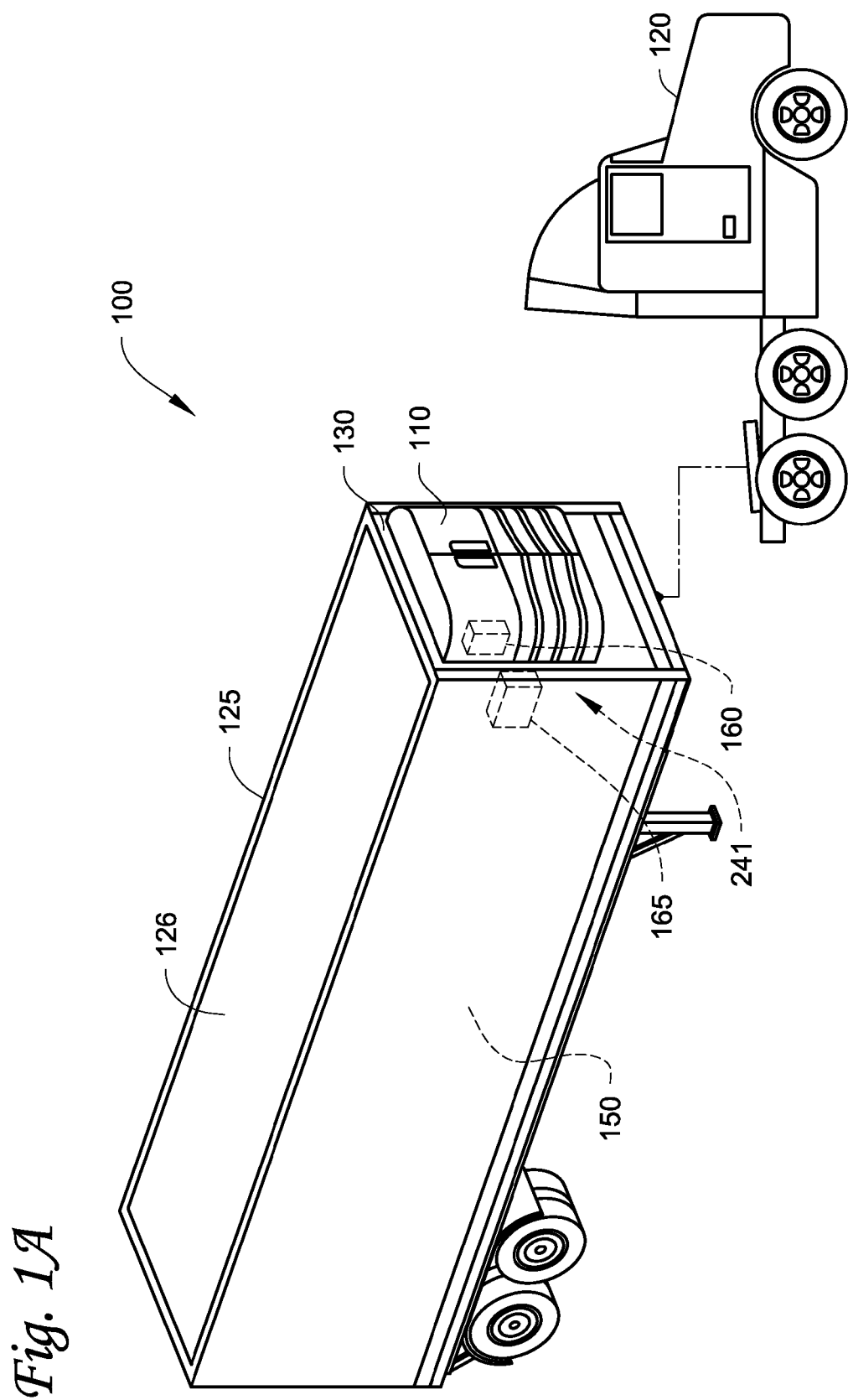
FIG. 1A illustrates a perspective view of a reefer attached to a tractor, according to one embodiment.

FIG. 1A illustrates one embodiment of a TRS 100 for a transport unit (TU) 125 that is attached to a tractor 120. The TRS 100 includes a TRU 110 that controls refrigeration within the TU 125. The TRU 110 is disposed on a front wall 130 of the TU 125. In other embodiments, it will be appreciated that the TRU 110 can be disposed on a rooftop 126 of the TU 125. The tractor 120 is attached to and is configured to tow the transport unit 125. It will be appreciated that the embodiments described herein are not limited to trucks and trailer units, but can just as easily apply to any other suitable temperature controlled apparatuses such as a ship board container, an air cargo container or cabin, an over the road truck cabin, among others. The TRU 110 may comprise a programmable TRS Controller 241 that may comprise a single integrated control unit 160 or that may comprise a distributed network of TRS control elements 160, 165. The number of distributed control elements in a given network can depend upon the particular application of the principles described herein.

Figure 1B:
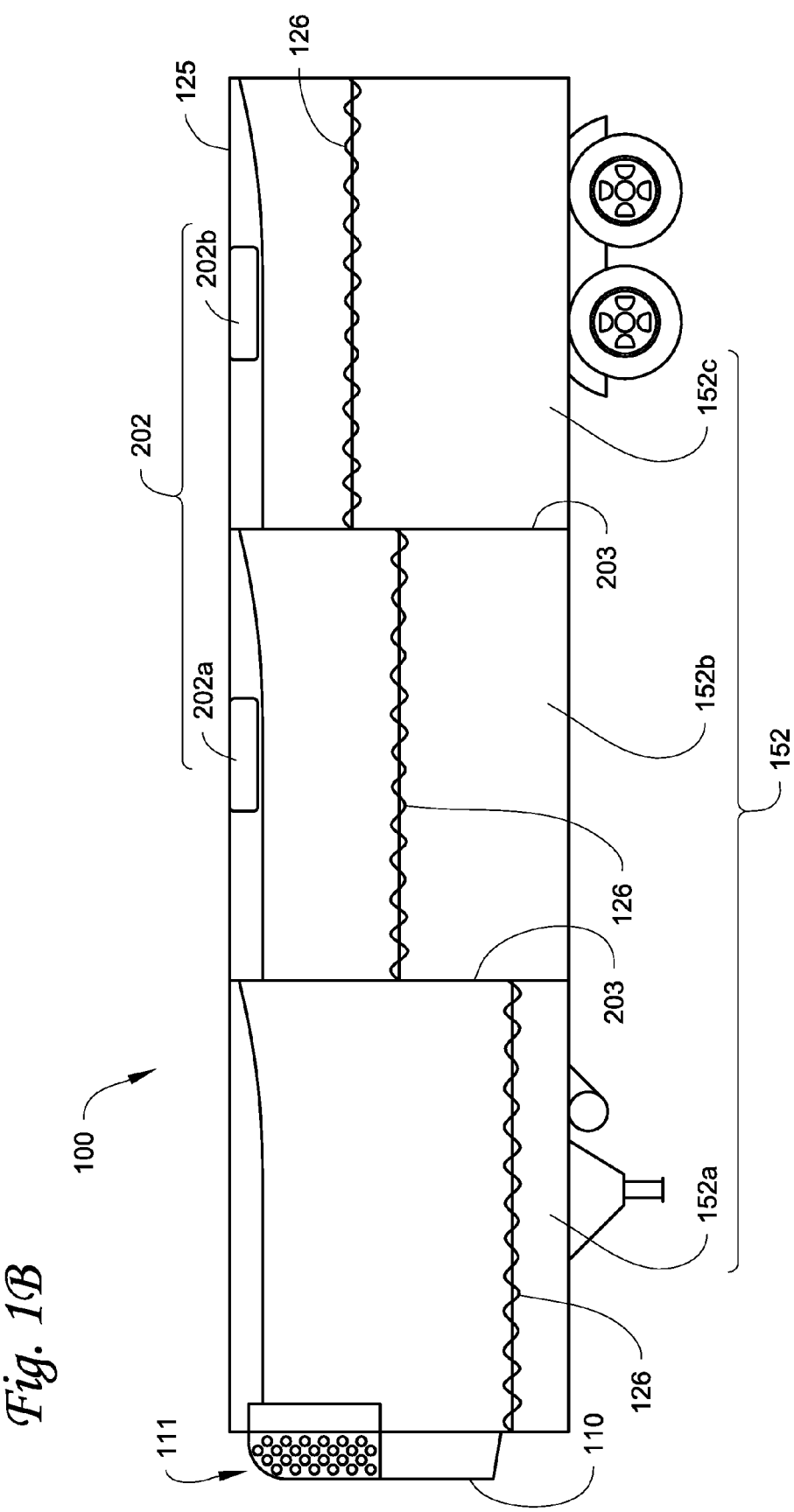
FIG. 1B illustrates a schematic cross sectional side view of a TU shown in FIG. 1A, according to one embodiment.

With reference to FIGS. 1A and 1B, the internal space 150 may be divided into a plurality of zones 152. The term "zone" means a part of an area of the internal space 150. In some examples, each of the zones 152 can have a set temperature that is the same or different from one another, and may be separated by a wall 203.

Note that in FIG. 1B, the internal space 150 is illustrated as being divided into three zones, a first zone 152*a*, a second zone 152*b* and a third zone 152*c*, where each of the zones 152 is divided into substantially equal areas. However, it is to be realized that the internal space 150 may be divided into any number of zones in any configuration that is suitable for refrigeration of the different zones. Examples of different configurations in which the zones 152 can be divided are illustrated in FIG. 1C.

Figure 1D:
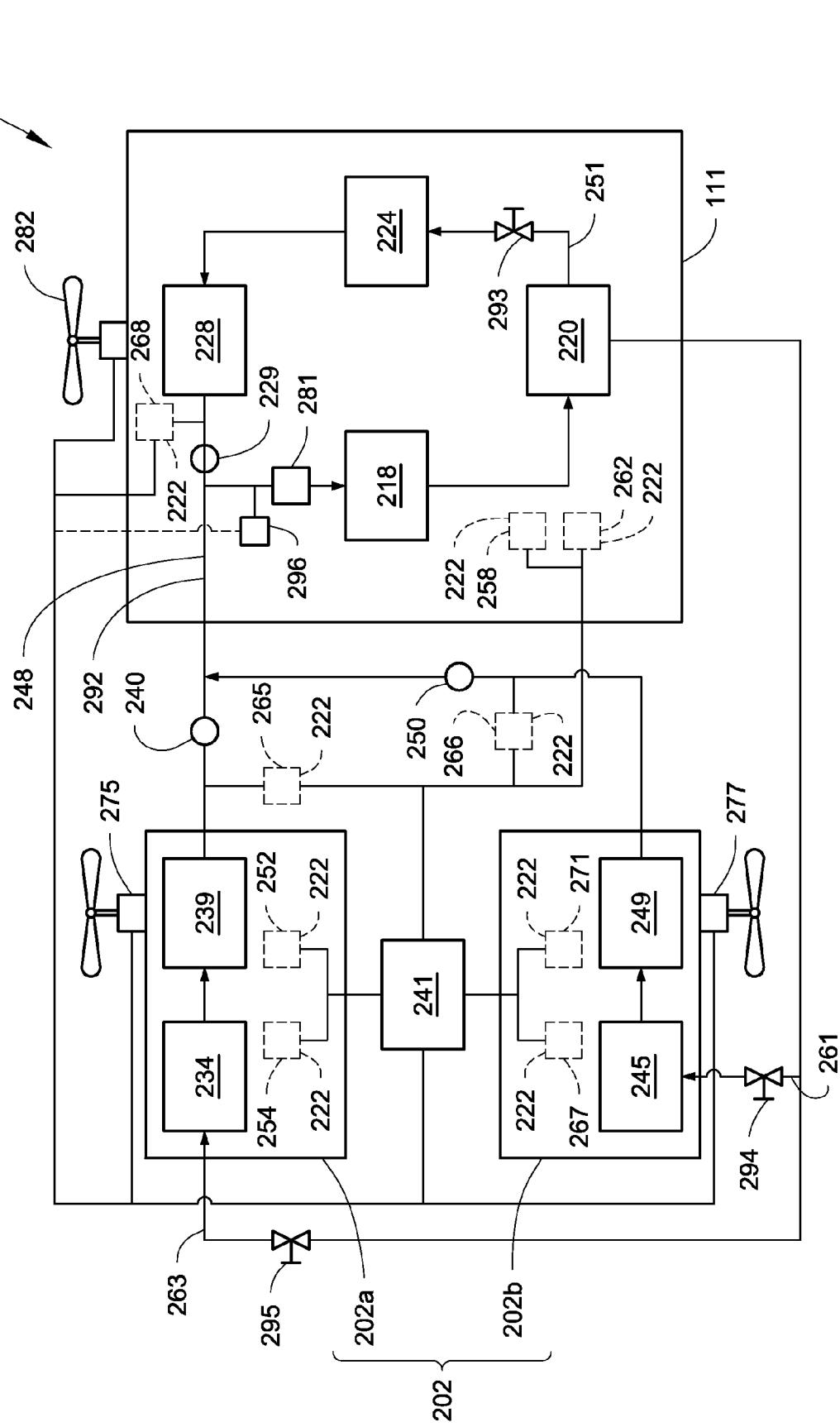
FIG. 1D illustrates a schematic view of a MTCS, according to one embodiment.

Referring to FIGS. 1B and 1D, the TRS 100 is a MTCS 200 in which different zones 152 of the internal space 150 are controlled to meet different refrigeration requirements in each of the zones 152. The MTCS 200 includes the TRU 110 as a host unit 111 and a plurality of remote units 202, namely a first remote unit 202*a* and a second remote unit 202*b*. The first remote unit 202*a* is contained in the second zone 152*b*, while second remote unit 202*b* is contained in the third zone 152*c*.

Each of the host unit 111 and the remote units 202 can be configured to cool the separate zones 152. In FIG. 1D, the host unit 111 is configured to cool the first zone 152*a*, the first remote unit 202*a* is configured to cool the second zone 152*b*, and the second remote unit 202*b* is configured to cool the third zone 152*c*. Note that the configurations of the MTCS 200 are not limited to those depicted in FIG. 1D, and can include any number of cooling units and can have any configuration that is suitable for cooling the zones 152.

Referring to FIG. 1D, the host unit 111 includes a host evaporator fan 282, a host condenser 220, a host compressor 218, a host evaporator 228 and a host expansion valve 224. The remote unit 202*a* includes a first evaporator fan 275, a first expansion valve 234 and a first evaporator 239. The second remote unit 202*b* includes a second evaporator fan 277, a second expansion valve 245 and a second evaporator 249. It is to be realized that the system 200 can include additional controls to place the respective zone(s) in a NULL state, for example, solenoid valves, etc.

In some embodiments, each of the evaporator fans 275, 277, 282 can be a single speed evaporator fan that is configured to operate in the ON or OFF state or a variable speed fan that is configured to operate at low speed, high speed, or completely variable speed. In some embodiments, each zone can have multiple evaporators connected in parallel and each evaporator unit can have multiple fans/blowers.

Note that in the discussion that follows, each of the evaporator fans 275, 277, 282 is discussed as being configured to operate in the ON or OFF state. However, it is to be realized that the concepts discussed below can apply to any of the configurations of the evaporator fans 275, 277, 282 discussed above.

During operation, the host compressor 218 receives refrigerant through a common suction line 248. The refrigerant then passes to the condenser 220, and from the condenser 220, the refrigerant output branches to split between the host unit 111 and the remote units 202. A first branch 251 runs through a first solenoid valve 293, the host expansion valve 224, the host evaporator 228 and a check valve 229 before joining the common suction line 248. A second branch 261 runs through a second solenoid valve 294, the second expansion valve 245, the second evaporator 249 and a check valve 250 before joining the common suction line 248. A third branch 263 extends through a third solenoid valve 295, the first expansion valve 234, the first evaporator 239 and a check valve 240 before joining the common suction line 248. A throttle valve 281 is provided upstream of the host compressor 218 and downstream of the check valves 229, 240, 250. The common suction line 248 then flows through the throttle valve 281 before returning back to the compressor 218.

In some examples, the throttle valve 281 can generally control an amount of compressor suction and thereby control the refrigerant flow through the evaporator as is generally understood in the art. The throttle valve 281 can be a mechanical or electrical throttle valve.

With reference to FIG. 1D, the MTCS 200 further includes a plurality of sensors 222. The plurality of sensors 222 include sensors 254, 267, 258 to detect a return air temperature in the units 202*a*, 202*b* and 111, respectively, sensors 252, 271, 262 to detect a discharge air temperature in the units 202*a*, 202*b* and 111, respectively, and sensors 265, 266, 268 to detect a suction pressure. The suction pressure optionally can be detected by a single suction pressure transducer 296 that is placed in the common suction line 248 before the throttle valve 281.

The MTCS 200 further includes the TRS Controller 241. The TRS Controller 241 generally can include a processor (not shown), a memory (not shown), a clock (not shown) and an input/output (I/O) interface (not shown) and can be configured to receive data as input from various components within the MTCS 200, and send command signals as output to various components within the MTCS 200.

Generally, the TRS Controller 241 is configured to control the refrigerant cycle of the MTCS 200. In one example, the TRS Controller 241 controls the operating states of each of the evaporator fans 275, 277, 282. In another example, the TRS Controller 241 controls the refrigeration cycle of the MTCS 200 to obtain various operating conditions (e.g., temperature, humidity, etc.) of the internal space 150 as is generally understood in the art.

In one example, during operation, the TRS Controller 241 receives information from the plurality of sensors 222 through the I/O interface as inputs, processes the received information using the processor based on an algorithm stored in the memory, and then sends command signals as outputs, to the evaporator fans 275, 277, 282.

Details of the various algorithms that can be stored in the memory of the TRS Controller 241 will now be provided below.

Figure 2:
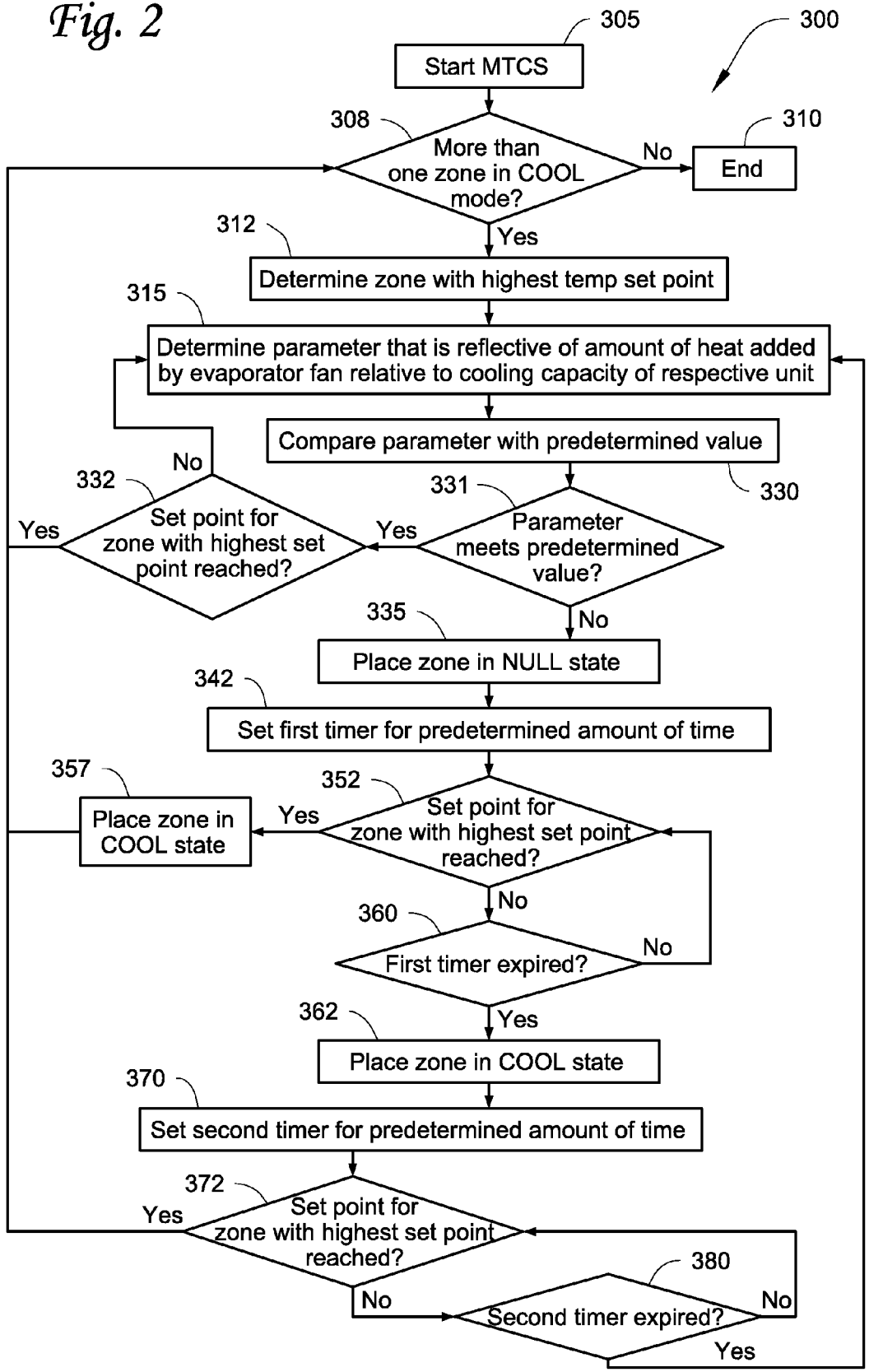
Figure 3:
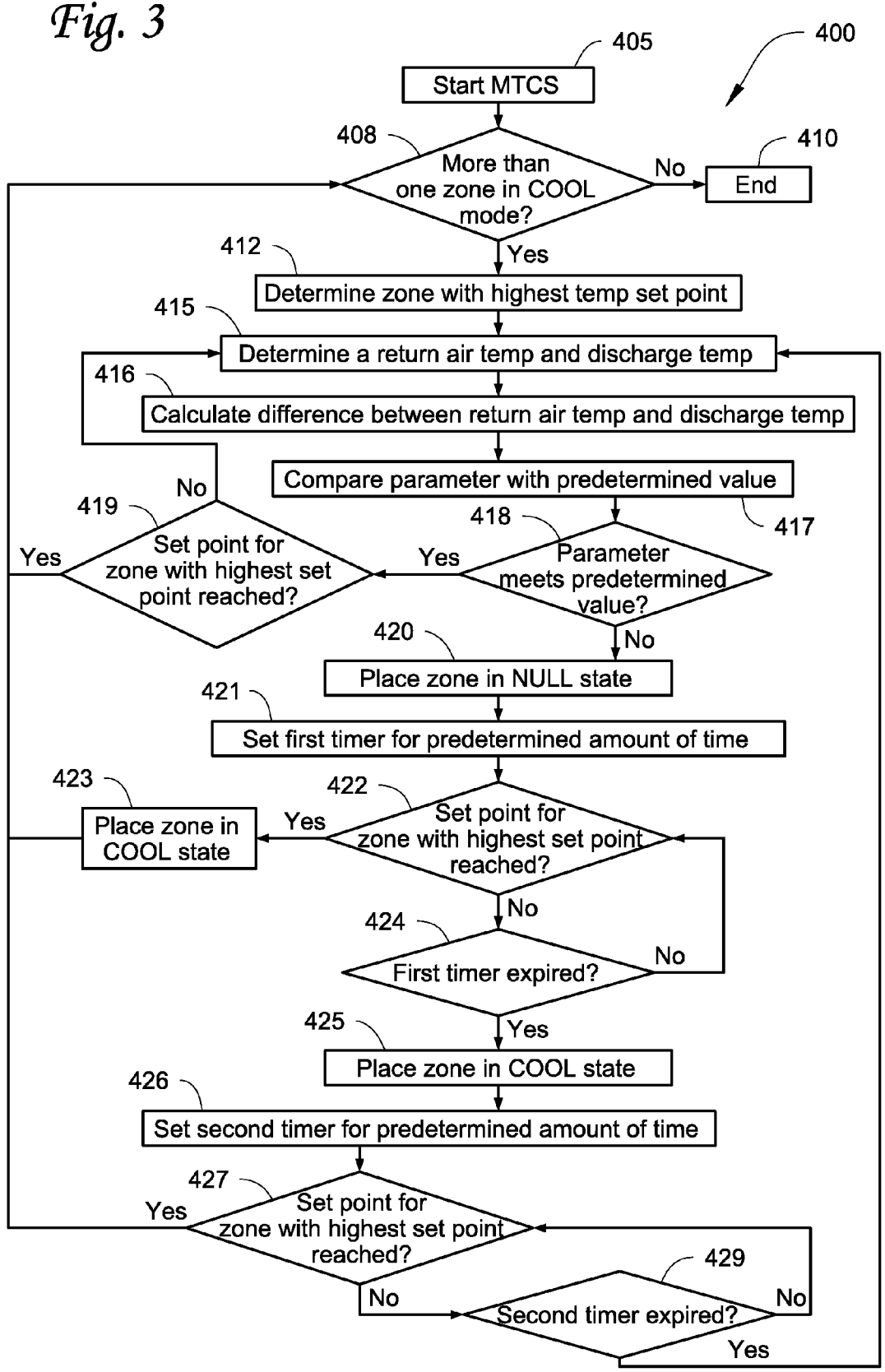

Generally, the TRS Controller 241 is configured to implement the disclosed process of controlling the operation of, e.g., one or more of the evaporator fans 275, 277, 282 and the evaporators 228, 239, 249, in the MTCS 200. In general, the processes shown in FIGS. 2-4 are executed by the executing program instructions (algorithms) stored in the memory of the TRS Controller 241. In some examples, a user can select the processes via, e.g., a human-machine interface (not shown) that is connected to the TRS Controller 241. In other examples, the processes can be set to a default setting.

In some examples, the processes described herein generally control dynamically, e.g., one or more of the evaporator fans 275, 277, 282 and the evaporators 228, 239, 249, in instances where running one or more of the evaporator fans 275, 277, 282 can lead to inefficiencies in energy consumption and fluctuations in temperature control.

For instance, problems can arise where more than two of the cooling units 111, 202, for example, the remote units 202a and 202b require cooling and the respective zones 152b, 152c have different set temperatures. For example, the zone 152c that is cooled by the remote unit 202b could have a higher set temperature than that of the zone 152b that is cooled by the remote unit 202a. In this instance, the zone 152c can require a higher evaporating temperature as compared to the evaporating temperature of the zone 152b. This means that the evaporator 249 for the remote unit 202b has a higher suction pressure relative to that of the evaporator 239 for the remote unit 202a, thereby dominating the pressure at the common suction line 248. This can cause the zone 152b not to cool. The zone 152b actually can be heating due to the heat added from the evaporator fan 275 running. Such occurrences can lead to, for example, increases in system run time, more fuel consumption and fluctuation in temperature control.

The processes described herein generally control dynamically, e.g., one or more of the evaporator fans 275, 277, 282 and the evaporators 228, 239, 249, included in the MTCS 200 to improve, for example, energy efficiency of the MTCS 200. The general process for controlling the operation of one or more of the evaporator fans 275, 277, 282 and the evaporators 228, 239, 249 is illustrated in FIG. 2 (see process 300). Note that in the example that follows, the process is illustrated as controlling one or more of the evaporator fans 275, 277, 282 and the evaporators 228, 239, 249. However, it is to be realized that other components included in the MTCS 200 can be controlled to achieve the same effect, namely, energy efficiency of the MTCS 200.

Referring to FIG. 2, at 305, the MTCS 200 is started. The process 300 then proceeds to 308.

Note that in the description that follows, one of the zones 152a, 152b, 152c being placed in a NULL state means that the respective evaporator fans 275, 277, 282 and the respective evaporators 228, 239, 249 are operated so that there is no or limited refrigerant flow and/or no or limited air flow in the respective zone. In some examples, one of the zones 152a, 152b, 152c being placed in a COOL state means that the respective evaporator fan 275, 277, 282 and/or the respective evaporator 228, 239, 249 is operated so there is refrigerant flow and/or air flow in the respective zone.

At 308, a determination is made if more than one of the zones 152a, 152b, 152c require cooling. In some examples, two or more of the zones 152a, 152b, 152c have temperature set points that are different from one another. If more than one of the zones 152a, 152b, 152c do not require cooling, then the process 300 ends at 310.

At 312, a determination is made as to the zone with the highest temperature set point relative to the other zones. In the present example, the zone with the highest temperature set point relative to the other zones is the zone 152c, as illustrated by the temperature set point level indicator 126 in FIG. 1B. The process 300 then generally involves satisfying the set point of the zone 152c first before satisfying the set points for the zones 152b and 152a.

At 315, the process 300 involves determining a parameter that is reflective of an amount of heat added by the evaporator fans 275, 282 relative to the cooling capacity of the respective units 202a, 111 for each of the respective zones other than the zone 152c, namely, the zones 152b and 152a. Then at 330, the parameter is compared to a predetermined value. At 331, a decision is made based on whether the parameter meets the predetermined value. If the parameter meets the predetermined value, then the process 300 proceeds to 332 where it is determined if the zone with the highest set point (zone 152c) has reaching its set point. If the zone 152c has met the set point requirement, then the process 300 transitions back to 308. If the zone with the highest set point (zone 152c) has not satisfied its requirement of reaching its set point, then the process transitions back to 315.

Referring back to 331, if the parameter does not meet the predetermined value, then the process 300 proceeds to 335 where the zones 152a, 152b are placed in a NULL state. Then at 342, a first timer is set for a predetermined amount of time. In some examples, the amount of time can be about two minutes. Then at 352, a determination is made as to whether the zone with the highest temperature set point is satisfied. If the zone 152c is satisfied, then zones 152a, 152b that were previously in the NULL state are placed in the COOL state and the process 300 transitions back to 308.

Referring back to 352, if the zone 152c is not satisfied, then the process 300 proceeds to 360 where a determination is made if the first timer has expired. If the first timer has not expired, then the process 300 transitions back to 352. If the first timer has expired, then at 362, any one of the zones 152a, 152b that was previously in the NULL state is placed in the COOL state. Then at 370, a second timer is set for a predetermined amount of time. Then at 372, a determination is again made as to whether the zone with the highest temperature set point (zone 152c) is satisfied. If the zone 152c is satisfied, then the process returns to 308. If the zone 152c is not satisfied, then the process 300 goes to 380 where a determination is made as to whether the second timer is expired. If the second timer is not expired, then the process 300 transitions back to 372. If the second timer in 380 expires, then the process 300 returns to 315

FIG. 3 illustrates one embodiment of a process 400 for controlling the operation of, e.g., one or more of the evaporator fans 275, 277, 282 and the evaporators 228, 239, 249, where the parameter used is the difference between a return air temperature and a discharge air temperature of the evaporator fans 275, 277, 282. At 405, the MTCS 200 is started. The process 400 then proceeds to 408.

At 408, a determination is made if more than one of the zones 152a, 152b, 152c require cooling. In some examples, two or more of the zones 152a, 152b, 152c have set temperatures that are different from one another. If more than one of the zones 152a, 152b, 152c do not require cooling, then the process 400 ends at 410.

At 412, a determination is made as to the zone with the highest temperature set point relative to the other zones. In the present example, the zone with the highest temperature set point relative to the other zones is the zone 152c, as illustrated by the temperature set point level indicator 126 in FIG. 1B. The process 400 then generally involves satisfying the set point of the zone 152c first before satisfying the set points for the zones 152 b and 152a.

At 415, the process 400 involves determining a return air temperature and a discharge temperature for each of the evaporators 228 and 239 that are used to cool the zones other than the zone 152c, namely, the zones 152a and 152b, respectively. At 416, the difference between the return air temperature and the discharge temperature is calculated ("the parameter"), and at 417, this difference ("the parameter") is compared with a predetermined value. In some examples, the predetermined value can be about 1° F.

Then, at 418, if the difference between the return air temperature and the discharge air temperature ("the parameter") meets the predetermined value, then the process moves to 419 where it is determined if the zone with the highest set point (zone 152c) has satisfied its requirement of reaching its set point. If the zone 152c has met the set point requirement, then the process 300 transitions back to 408. If the zone with the highest set point (zone 152c) has not satisfied its requirement of reaching its set point, then the process transitions back to 415.

Referring back to 418, if the difference between the return air temperature and the discharge air temperature ("the parameter") does not meet the predetermined value, then the zones 152a, 152b are placed in a NULL state (420).

Next, a first timer is set for a predetermined amount of time (421). In some examples, the first timer is set for an estimated amount of time for the zone 152c to reach its set point. In some examples, the predetermined amount of time for the first timer can be about 10 minutes.

Then at 422, a determination is made as to whether the zone with the highest temperature set point (zone 152c) is satisfied. If the zone 152c is satisfied, then the zones 152a, 152b that were previously operated in the NULL state is operated in the COOL state and the process transitions back to 408. If the zone 152c is not satisfied, then the process 400 transitions to 424 where a determination is made as to whether the first timer is expired. If the first timer is not expired, then the process 400 goes back to 422. If the first timer in 424 expires, then any one of the zones 152a, 152b that was previously operated in the NULL state is operated in the COOL state (425).

A second timer then is set for a predetermined amount of time at 426. In some examples, the second timer is set for an estimated amount of time for the zone 152c to reach its set point. In some examples, the predetermined amount of time for the second timer can be about two minutes.

Then at 427, a determination is again made as to whether the zone with the highest temperature set point (152c) is satisfied. If the zone 152c is satisfied, then the process 400 returns to 408. If the zone 152c is not satisfied, then the process 400 goes to 429 where a determination is made to see if the second timer is expired. If the second timer has not expired, the process 400 returns to 427. If the second timer expires, then the process returns to 415.

FIG. 4 illustrates one embodiment of a process 500 for controlling the operation of, e.g., one or more of the evaporator fans 275, 277, 282 and the evaporators 228, 239, 249, where the parameter used is a suction pressure that is, for example, located on a suction line 292 upstream of the throttle valve 281. At 505, the MTCS 200 is started. The process 500 then proceeds to 508.

At 508, a determination is made if more than one of the zones 152a, 152b, 152c require cooling. If more than one of the zones 152a, 152b, 152c do not require cooling, then the process 500 ends at 510.

At 512, a determination is made as to the zone with the highest temperature set point relative to the other zones. In the present example, the zone with the highest temperature set point relative to the other zones is the zone 152c, as illustrated by the temperature set point level indicator 126 in FIG. 1B. The process 500 then generally involves satisfying the set point of the zone 152c first before satisfying the set points for the zones 152b and 152a.

At 515, the process 500 involves determining a suction pressure that is, for example, located on the suction line 292 upstream of the throttle valve 281. In some implementations, the throttle valve 281 is an electronic throttle valve.

The process 500 further involves calculating a saturated temperature using the determined value for the suction pressure (516). In some examples, the calculation of the saturated temperature is based on a refrigerant used in the MTCS 200.

Then, at 517, a return air temperature is determined for each of the evaporators 228 and 239 that are used to cool the zones other than the zone 152c, namely, the zones 152a and 152b, respectively. Then, at 518, the return air temperature is compared with X, where X is a function of (1) the determined value for the saturated temperature, and (2) Y, which is a second predetermined value. In one instance, X equals the determined value for the suction pressure plus Y. In some instances, Y can equal about 5° F.

Then, at 519, a decision is made as to whether the return air temperature meets the requirements of X. If the return air temperature meets the requirements, then a decision at 520 is made as to whether the zone with the highest set point (zone 152c) has satisfied its requirement of reaching its set point. If the zone 152c has met the set point requirement, then the process transitions back to 508. If the zone with the highest set point (zone 152c) has not satisfied its requirement of reaching its set point, then the process transitions back to 515.

Referring back to 519, if the decision determines that the return air temperature does not meet the requirement of X, then one or more of the zones 152a, 152b is placed in the NULL state. A third timer is then set for a predetermined amount of time (522). In some examples, the third timer is set for an estimated amount of time for the zone 152c to reach its set point. In some examples, the predetermined amount of time for the third timer can be about 10 minutes.

The process 500 then continues to 523 where a determination is made as to whether the zone with the highest temperature set point (zone 152c) is satisfied. If the zone 152c is satisfied, then the zones 152a, 152b that are operating in the NULL state are operated in the COOL state (524) and the process transitions back to 508. If the zone 152c is not satisfied at 523, then the process 500 moves to 525 where it is determined if the third timer has expired. If the third timer is not expired, then the process 500 returns to 523. If the third timer is expired, then any one of the zones 152a, 152b that are operating in the NULL state are operated in the COOL state (526).

Then, a fourth timer is set for a predetermined amount of time (527). In some examples, the fourth timer is set for an estimated amount of time for the zone 152c to reach its set point. In some examples, the predetermined amount of time for the fourth timer can be about two minutes.

Then at 528, a determination is made as to whether the zone with the highest temperature set point (zone 152c) is satisfied. If the zone 152c is satisfied, then the process transitions back to 508. If the zone 152c is not satisfied, then the process 500 goes to 529 to determine if the fourth timer has expired. If the fourth timer has not expired, then the process 500 returns to 528. If the fourth timer has expired, then the process 500 goes back 515.

Aspects:

Any of aspects 1-10 can be combined with any of aspects 11-20.

Aspect 1. A multi-zone temperature control system that is configured to cool a plurality of zones, comprising:
- a host unit;
- at least one remote unit that is connected to the host unit;
- wherein each of the host unit and the at least one remote unit includes an evaporator fan; and
- a controller that is configured to:
  - determine a zone with the highest temperature set point relative to the other of the plurality of zones;
  - determine a parameter that is reflective of an amount of heat added by the evaporator fan relative to the cooling capacity of a respective unit;
  - determine if the zone should be in a COOL state or a NULL state based on the parameter; and
  - when the set point of the zone with the highest temperature set point is satisfied, switch the zone to the NULL state.

Aspect 2. The system of aspect 1, wherein the parameter is a difference between a return air temperature and a discharge air temperature.

Aspect 3. The system of any of aspects 1-2, wherein the parameter is determined for the zone other than the zone with the highest temperature set point.

Aspect 4. The system of aspect 2, wherein the controller is configured to compare the parameter with a predetermined value.

Aspect 5. The system of aspect 4, wherein the controller is configured to switch the zone to the NULL state when the parameter does not meet the predetermined value.

Aspect 6. The system of aspect 5, wherein the controller is configured to set a first timer after switching the zone to the NULL state.

Aspect 7. The system of aspect 6, wherein the controller is configured to operate the zone in the COOL state if the set point for the zone with the highest set point is not reached after the first timer expires.

Aspect 8. The system of aspect 1, wherein the parameter is a suction pressure.

Aspect 9. The system of aspect 8, wherein the controller is configured to compare the parameter with a predetermined value.

Aspect 10. The system of aspect 9, wherein the controller is configured to switch the zone to the NULL state for the zone when the parameter does not meet the predetermined value.

Aspect 11. A method of controlling an operation of evaporator fans in a multi-zone temperature control system that includes a controller, a host unit and one or more remote units, wherein the host unit and the one or more remote units are configured to distribute a cooling capacity to each of a plurality of zones, and wherein each of the host unit and the one or more remote units includes an evaporator fan, the method comprising:
- determining a focus zone of the plurality of zones with the highest temperature set point relative to the other of the plurality of zones using the controller;
- determining, via the controller, a parameter that is reflective of an amount of heat added by the evaporator fan of the focus zone relative to the cooling capacity of the respective host unit or remote unit of the focus zone;
- determining if the focus zone should be operated in a COOL state or a NULL state based on the determined parameter;
- setting a timer for a predetermined amount of time; and
- when the set point of the focus zone is satisfied, switching the zone to the NULL state.

Aspect 12. The method of aspect 11, wherein the parameter is a difference between a return air temperature and a discharge air temperature.

Aspect 13. The method of any of aspects 11-12, wherein the parameter is determined for each of the plurality of zones other than the focus zone.

Aspect 14. The method of any of aspects 12-13, further comprising comparing the parameter with a predetermined value.

Aspect 15. The method of aspect 14, further comprising switching the zone to the NULL state when the parameter does not meet the predetermined value.

Aspect 16. The method of aspect 15, further comprising setting a first timer after switching the focus zone to the NULL state.

Aspect 17. The method of aspect 16, further comprising operating the focus zone in the COOL state when the set point for the focus zone is not reached after the timer expires.

Aspect 18. The method of aspect 11, wherein the parameter is a suction pressure.

Aspect 19. The method of aspect 18, further comprising comparing the parameter with a predetermined value.

Aspect 20. The method of aspect 19, further comprising switching the focus zone to the NULL state when the parameter does not meet the predetermined value.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. A multi-zone temperature control system that is configured to cool a plurality of zones, comprising:
- a host unit;
- at least one remote unit that is connected to the host unit;
  - \wherein each of the host unit and the at least one remote unit includes an evaporator fan; and
- a controller that is configured to:
  - determine a first zone with the highest temperature set point relative to the other of the plurality of zones;
  - determine whether operation of the evaporator fan of a zone of the plurality of zones other than the first zone is capable of cooling the zone of the plurality of zones other than the first zone when the first zone is operated in a COOL state;
  - operate the zone of the plurality of zones other than the first zone in a COOL state when the operation of the evaporator fan of the zone of the plurality of zones other than the first zone is capable of cooling the zone of the plurality of zones other than the first zone and operate the zone of the plurality of zones other than the first zone in a NULL state when the operation of the evaporator fan of the zone of the plurality of zones other than the first zone is capable of cooling the zone other than the first zone;
  - when the zone of the plurality of zones other than the first zone is operated in the NULL state for a first predetermined amount of time, determine whether the first zone has reached the set point and operate the first zone in the COOL state for a second predetermined amount of time when the first zone has not reached the set point after the first predetermined amount of time, at the end of the second predetermined amount of time, determine whether the operation of the evaporator fan of the zone of the plurality of zones other than the first zone is capable of cooling the zone of the plurality of zones other than the first zone, and when the set point of the zone with the highest temperature set point is satisfied, switch the first zone to the NULL state.

2. The system of claim 1, wherein determining whether the operation of the evaporator fan of the zone of the plurality of zones other than the first zone is capable of cooling the zone of the plurality of zones other than the first zone is based on a difference between a return air temperature and a discharge air temperature.

3. The system of claim 1, wherein the controller is configured to set a first timer after switching the zone of the plurality of zones other than the first zone to the NULL state.

4. The system of claim 3, wherein the controller is configured to operate the first zone in the COOL state if the set point for the zone with the highest set point is not reached after the first timer expires.

5. The system of claim 1, wherein determining whether the operation of the evaporator fan of the zone of the plurality of zones other than the first zone is capable of cooling the zone of the plurality of zones other than the first zone is based on a suction pressure.

6. A method of controlling an operation of evaporator fans in a multi-zone temperature control system that includes a controller, a host unit and one or more remote units, wherein the host unit and the one or more remote units are configured to distribute a cooling capacity to each of a plurality of zones, and wherein each of the host unit and the one or more remote units includes an evaporator fan, the method comprising:

determining a first zone of the plurality of zones with the highest temperature set point relative to the other of the plurality of zones using the controller;

determining, via the controller, whether operating an evaporator fan of a zone of the plurality of zones other than the first zone is capable of cooling the zone of the plurality of zones other than the first zone when the first zone is operated in a COOL state;

operating the zone of the plurality of zones other than the first zone in a COOL state when operating the evaporator fan is capable of cooling the zone of the plurality of zones other than the first zone, and operating the zone of the plurality of zones other than the first zone in a NULL state when operating the evaporator fan will not cool the zone of the plurality of zones other than the first zone;

setting a first timer for a predetermined amount of time; and when the set point of the first zone is satisfied, switching the first zone to the NULL state;

setting the first timer after switching the zone of the plurality of zones other than the first zone to the NULL state, and operating the first zone in the COOL state when the set point for the first zone is not reached after the first timer expires, and setting a second timer for a predetermined amount of time, and if the first zone has not reached the set point on expiration of the second timer, determining, via the controller, whether operating the evaporator fan of the zone of the plurality of zones other than the first zone is capable of cooling the zone of the plurality of zones other than the first zone.

7. The method of claim 6, wherein determining whether operating the evaporator fan of the zone of the plurality of zones other than the first zone is capable of cooling the zone of the plurality of zones other than the first zone is based on a difference between a return air temperature and a discharge air temperature.

8. The method of claim 6, wherein determining whether operating the evaporator fan of the zone of the plurality of zones other than the first zone is capable of cooling the zone of the plurality of zones other than the first zone is based on a suction pressure.

9. The method of claim 6, wherein the predetermined amount of time that the first timer is set for is an estimated amount of time for the first zone to reach its set point.

10. The method of claim 6, wherein the predetermined amount of time that the second timer is set for is an estimated amount of time for the first zone to reach its set point.

11. The method of claim 6, further comprising:

wherein when the first timer expires, setting the zones other than the first zone to the COOL state.

12. The method of claim 6, wherein determining whether operating the evaporator fan is capable of cooling the zone of the plurality of zones other than the first zone includes comparing an amount of heat added by operating the evaporator fan with a cooling capacity of the remote unit of the zone of the plurality of zones other than the first zone.

13. The method of claim 6, wherein determining whether operating the evaporator fan is capable of cooling the zone of the plurality of zones other than the first zone includes determining a difference between a return air temperature of the evaporator fan and a discharge temperature of the evaporator fan.

14. The method of claim 13, wherein determining whether operating the evaporator fan is capable of cooling the zone of the plurality of zones other than the first zone further includes comparing the difference between the return air temperature of the evaporator fan and the discharge temperature of the evaporator fan with a predetermined value.

15. The method of claim 6, wherein determining whether operating the evaporator fan is capable of cooling the zone of the plurality of zones other than the first zone includes:

determining a suction pressure; and determining a saturated temperature based on the suction pressure.

16. The method of claim 15, wherein determining whether operating the evaporator fan is capable of cooling the zone of the plurality of zones other than the first zone further includes:

determining a return air temperature of the evaporator fan;

determining a value based on the saturated temperature; and comparing the return air temperature of the evaporator fan to the value.

* * * * *